United States Patent Office
3,442,760
Patented May 6, 1969

3,442,760
INTEGRAL NUCLEAR REACTOR WITH COOLANT PENETRATIONS FORMED IN A SEPARABLE MODULE OF THE REACTOR VESSEL
Shepherd Rigg, Walton, Warrington, England, assignor to United Kingdom Atomic Energy Authority, London, England
Filed Oct. 26, 1966, Ser. No. 589,612
Claims priority, application Great Britain, Nov. 2, 1965, 46,442/65
Int. Cl. G21c *15/00;* F22b *1/00*
U.S. Cl. 176—51                     2 Claims

ABSTRACT OF THE DISCLOSURE

An integral nuclear reactor-steam generator construction in which the pressure vessel is made in three parts, a body portion, a closure member, and an annular member clamped between the body portion and the closure member. The annular member is penetrated by secondary coolant inlets and outlets.

---

This invention relates to nuclear reactors and more particularly to nuclear reactors of the kind having a reactor core and a heat exchanger housed in a single reactor vessel; such reactors are referred to as integral nuclear reactors. A secondary coolant for use in a circuit external to the vessel is heated in the heat exchanger by transfer of heat from a primary coolant passed through the core.

It has been usual hitherto for the secondary coolant connections between the heat exchanger and the external circuit to be taken through penetrations in the vessel wall. Especially when the primary coolant is pressurized to high pressures, such penetrations in the vessel wall may call for greater wall thicknesses than would otherwise be necessary and hence makes the vessel more expensive.

The present invention avoids penetration of the vessel wall for the secondary coolant connections by providing a solid annular member separably interposed in coaxial sealed relationship between a body portion and a closure member of the vessel, the annular member having penetrations in which secondary coolant inlet and outlet headers in the form of pipes are fitted in sealed manner for connecting the heat exchanger with the external circuit.

The invention will be further described with reference to the accompanying drawings in which.

Figure 1A:
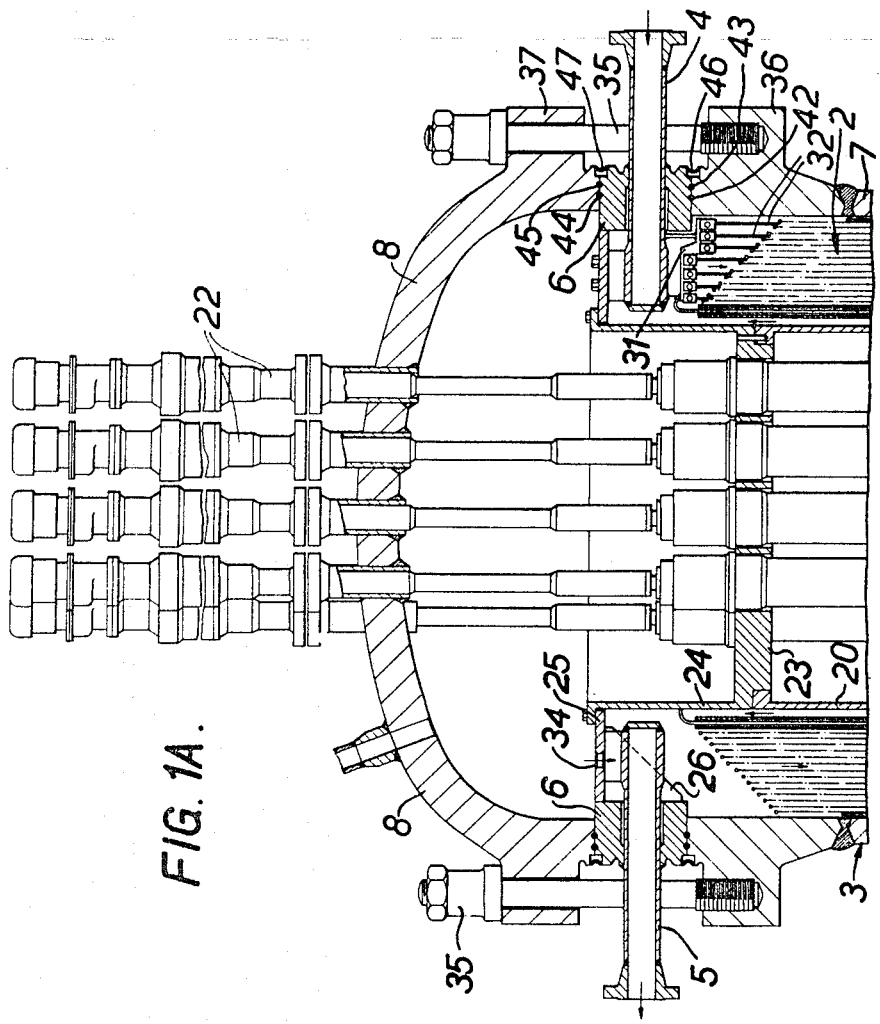
FIGURES 1A and 1B are the upper and lower parts seen in section of one example of nuclear reactor in accordance with the invention.

In greater detail, the core 1 comprises fuel assemblies 9, an apertured grid 10 and shrouds 11, 12 supported in the vessel 3. An annular space betwen the shroud 12 and the vessel 3 is divided by a baffle 13 into a pump inlet plenum 14 and a pump outlet plenum 15. The plenum 15 communicates with a coolant inlet plenum 16 below the core 1. Three primary coolant pumps 17 (of which one is shown) are connected by coaxial ducting 18 to the plenums 14, 15. The pumps 17 are equi-spaced around the vessel 3, are supported by the ducting 18 and are steadied at their upper ends by brackets 19 projecting from the vessel 3. During reactor operation primary coolant, such as water, at high pressure enters the plenum 14 at its upper end, is pumped by the pumps 17 to the plenum 15 and thence to the plenum 16 to flow upwardly through the core 1.

Above the core a sleeve or shroud 20 coaxial with the vessel defines an inner control mechanism plenum 21 housing control mechanisms 22 and an outer annular plenum housing the heat exchanger 2. The control mechanisms 22 are operable to vary the extent of insertion of control pins between fuel pins of the fuel assemblies 9, and project at their upper end regions in sealed fashion through the closure member 8 which is shown in the form of a pressure vessel lid. The control mechanisms are located within the vessel 3 by an apertured plate 23 joined to the sleeve 20 and also joined by way of a sleeve 24 to an annular plate 25 mounted from the member 6, support webs 26 being provided.

Figure 1B:
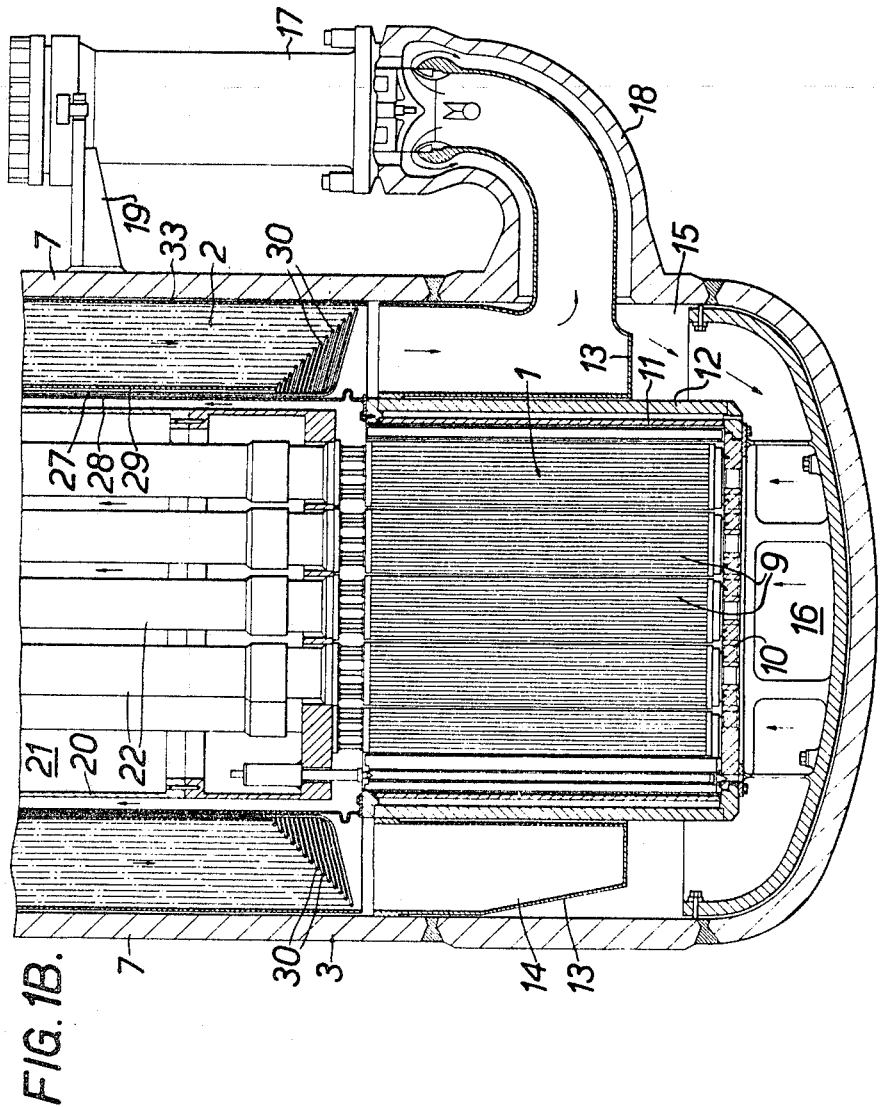
Figure 2:
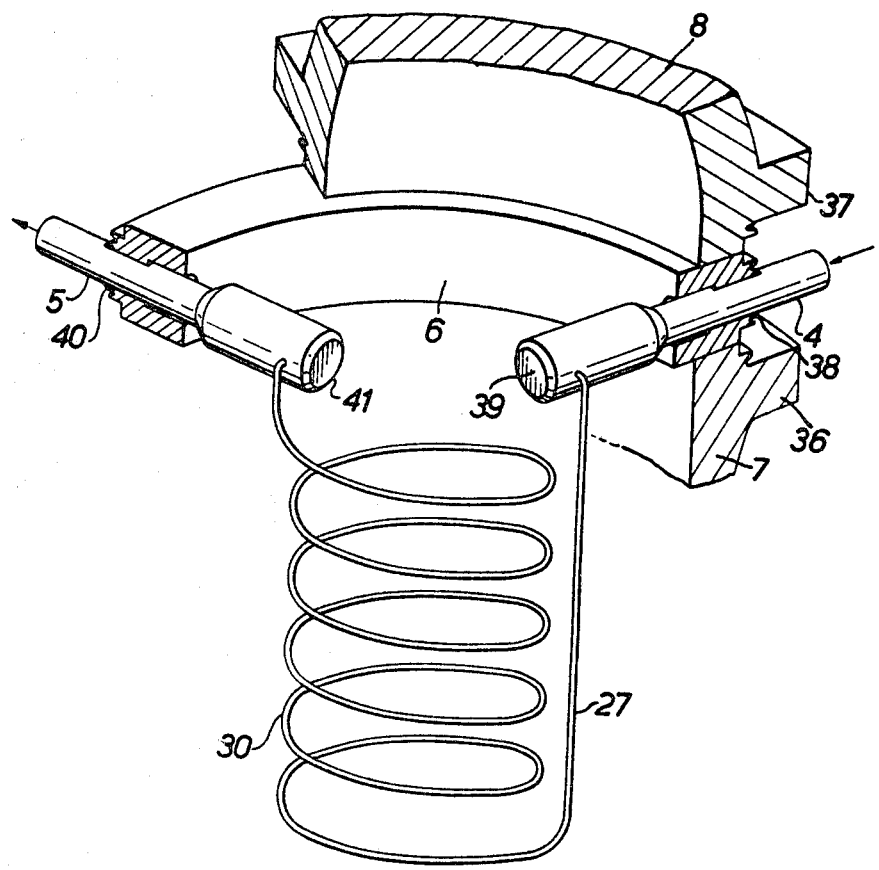
FIGURE 2 shows on a reduced scale a perspective view of parts of FIGURE 1.

Whilst only one inlet header 4 is shown in the FIGURES 1 and 2 it is to be understood that a number of such headers may be employed. Typically there are three equip-spaced inlet headers (such as the inlet header 4), each having an associated outlet header (such as the outlet header 5) circumferentially spaced from it by 60°. Downcomer tubes 27 connected at their upper ends to tube plate portions of the inlet headers extend thorugh a narrow annulus defined by inner and outer sleeves 28, 29 to connect at their lower ends with helically coiled riser tubes 30 which connect at their upper ends with tube plate portions of the outlet headers. Primary coolant heated in passage through the core passes upwardly in the annulus between the sleeves 20, 28 to flow downwardly over the tubes 30 to the plenum 14. Secondary coolant such as water passes through the inlet headers 4 and downcomer tubes 27 and then upwardly through the riser tubes 30 to the outlet headers 5, the secondary coolant being heated by the primary coolant flowing downwardly over the tubes 30 which are conveniently located at their upper ends by a plate and hanger arrangement, such as an arrangement of a plate 31 and hangers 32 as shown in FIGURE 1 of the drawings, and protected by an outer sleeve 33. A portion of the primary coolant also flows upwardly in the plenum 21 to pass through ports 34 in the plate 25 and then flow downwardly over the tubes 30. Primary coolant flow within the reactor vessel is indicated by arrows.

FIGURE 2 shows the annular member 6 sealed between flanges 36, 37 on the components 7, 8 respectively. The inlet header 4 passes through a penetration in the wall of the member 6 and is sealed to it by a weld 38. The header 4 is in the form of a pipe, the inner portion inside the vessel being closed at its end by a weld cap 39 and the outer portion outside the vessel being adapted for connection to a feed water supply system by means of an inlet duct (not shown). The downcomer tube 27 is connected at its upper end to the header 4 and at its lower end to the lower end of the riser tube 30, which has its upper end connected to the associated outlet header 5. The header 5 is also in the form of a pipe passing through and sealed to a penetration in the wall of the member 6 by a weld 40 and having the end of its inner portion sealed by a welded end cap 41 whilst the end of its outer portion is adapted for connection to a heat utilization by means of an outlet duct (not shown). It is to be understood that banks of heat exchange tubes extend in parallel between an inlet header and its associated outlet header, one only being shown in FIGURE 2 for the sake of clarity.

In the case described above of three inlet headers and three outlet headers, the annular member 6 has six circumferentially equi-spaced penetrations for the header. The axes of the penetrations lie in a plane perpendicular to the axis of the member 6. The member 6 is sealed between the cylindrical body portion 7 of the pressureresistant vessel 3 and the closure member 8 by bolts 35 (FIGURE 1) extending between the flanges 36, 37 on the components 7, 8 respectively, sealing rings 42, 43 between the components 6, 36, sealing rings 44, 45 between the components 6, 37, an anular diaphragm 46 welded to the components 6, 36 and an annular diaphragm 47 welded to the components 6, 37.

The annular member 6 is of robust form and is not penetrated for purposes other than passage of the heat exchanger inlet and outlet headers.

Figure 3:
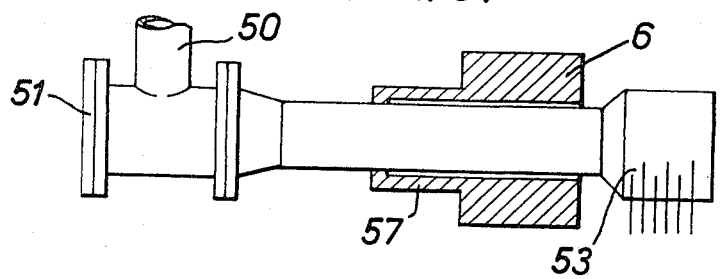
FIGURES 3, 4 and 5 show diagrammatically alternative constructions of header which can be employed with the annular member.
Figure 4:
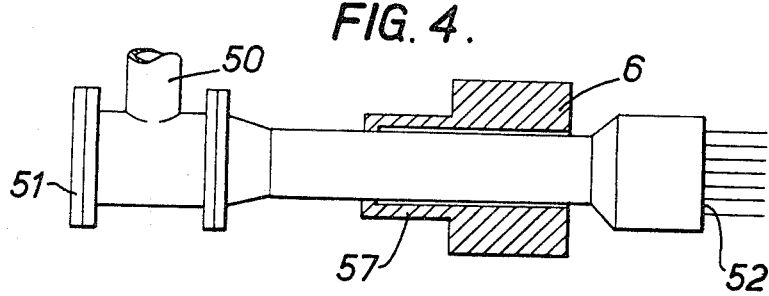
Figure 5:
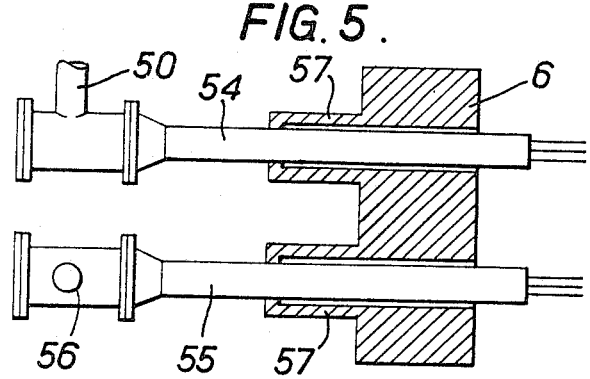

All the alternatives of FIGURES 3, 4 and 5 show the features of the duct 50 connecting at an angle, i.e. a right angle as illustrated, with the outer portion of the header and the closing of the end of this outer portion with a detachable flanged cover plate 51. By removal of this cover plate access can be gained to the interior of the header and hence the tube plate portion to which the heat exchanger tubing is connected. Such access is useful for the plugging at the tube plate of heat exchanger tubes which have been found to be defective. The plugging operation is made easier if, as shown in FIGURE 4, the tube plate 52 is formed at the end of the inner portion of the header rather than at the cylindrical surface as at 53 in FIGURE 3. When at the end, the tube plate is in a confronting relationship with the access opening obtained by removal of the cover plate 51.

FIGURE 5 is illustrative of greater sub-division of the connections which are established through the annular member 6 between the heat exchangers and the external secondary coolant circuit. The pipe like headers 54 and 55 are of smaller cross section and are therefore akin to manifolds. These headers are arranged in the annular member in more than one circumferentially extending row, i.e. two rows as illustrated. Although the headers in adjacent rows may be staggered, those shown at 54 and 55 are one above the other. This means that the duct 56 corresponding in thre case of the header 55 to the duct 50 of the header 54 should be connected at an angle not only to the respective header but to the duct 50 as well. The construction of header employed in FIGURE 5 is otherwise similar to that of FIGURE 4.

It is also to be noted that the alterations of FIGURES 3, 4 and 5 employ a thermal sleeve 57 for the fitting of a header in its respective penetration, one end of the sleeve being connected to the annular member and the other end to the header. The main aim of such a sleeve is to create along its length an axial temperature distribution in respect of which the resutling thermal stresses are acceptable.

An integral reactor in accordance with the invention offers a number of advantages. Thus alignment problems during reactor assembly are reduced as compared with reactors in which the headers project through the body portion of the reactor vessel. In the example described above the assembly procedure is that the inlet and outlet headers are welded in position i.e. in the penetrations of the annular member 6, the tubes 27, 30 are then welded to the headers together with assembly of the components 28, 29, 31 to 33, and this structure is then positioned as a unit within the body portion 7 of the vessel, followed by sealing of the member 6 between the portion 7 and the closure member 8.

The invention also offers the possibility of a significant reduction in the length of the reactor vessel as compared with reactors in which the headers project through the body portions of the reactor vessel. Thus in the example described above the headers are at the general level of the effective junction of the body portion and the closure member of the vessel, whereas with reactors in which the headers project through the body portion of the vessel, the headers have to be placed a reasonable distance below the junction of the body portion and the closure member, thus necessitating a greater vessel length for a given length of heat exchanger.

In the example described above with refernece to FIGURES 1 and 2 the heat exchanger is designed for once-through steam generation, sleeves 28, 29 being provided to limit primary coolant flow over the downcomer tubes 27 and thus limit the tendency for secondary coolant flow instabilities to occur in these downcomer tubes as a result of heating by the primary coolant. Whilst this arrangement with its helical riser tubes is economically attractive, it is to be understood that the invention is not limited to such an arrangement. Thus the heat exchanger may be designed for steam generation on a recirculating basis, and the riser tubes may be of e.g. modular form.

What I claim is:

1. In an integral nuclear reactor having a reactor core and a heat exchanger housed in a single reactor vessel having a body portion and a closure member with the heat exchnager being annularly arranged about a control mechanism plenum above the core, a secondary coolant for use in a circuit external to the vessel being heated in the heat exchanger by transfer of heat from a primary coolant passed through the core, the improvement comprising an annular member interposed separably in coaxial sealed relationship between, and clamped between, the body portion and closure member of the reactor vessel, secondary coolant inlets and outlets fitted sealingly in respective penetrations through the annular member, tubes of the heat exchanger being connected at one end to an inlet header tube plate and at the other end to an outlet header tube plate, and secondary coolant inlet and outlet ducts connected to the respective headers externally of the vessel.

2. A nuclear reactor as set forth in claim 1, wherein the annular member has penetrations arranged in more than one circumferentially extending row.

References Cited

UNITED STATES PATENTS

| | | | |
|---|---|---|---|
| 3,151,034 | 9/1964 | Douglas et al. | 176—53 |
| 3,254,633 | 6/1966 | Ammon et al. | 122—32 |
| 3,255,088 | 6/1966 | Sprague et al. | 176—53 |
| 3,279,439 | 10/1966 | Ammon | 122—34 |
| 3,290,222 | 12/1966 | Schoessow et al. | 176—65 |
| 3,312,596 | 4/1967 | Grain | 176—50 |

FOREIGN PATENTS 1,414,177 9/1965 France.

BENJAMIN R. PADGETT, *Primary Examiner.*

H. E. BEHREND, *Assistant Examiner.*

U.S. Cl. X.R.

176—65, 53; 122—32